United States Patent

Kubodera et al.

[15] 3,647,390
[45] Mar. 7, 1972

[54] APPARATUS FOR SYNTHESIS OF PEPTIDES OR THE LIKE ORGANIC COMPOUNDS

[72] Inventors: Toshiya Kubodera; Tasuku Hara; Hideki Makabe, all of Kyoto, Japan

[73] Assignee: Shimadzu Seisakusho Ltd., Kyoto, Japan

[22] Filed: July 3, 1969

[21] Appl. No.: 838,960

[30] Foreign Application Priority Data

July 8, 1968 Japan..................................43/48048

[52] U.S. Cl..............................23/252 R, 23/253 R, 23/259, 260/112.5
[51] Int. Cl.....................................................C07c 103/52
[58] Field of Search.....................23/252, 253, 254, 260, 285; 260/112.5

[56] References Cited

UNITED STATES PATENTS 3,531,258  9/1970  Merrifield et al. ........................23/252
3,557,077  1/1971  Brundfeldt et al. ...................23/253 X

OTHER PUBLICATIONS

Edman et al., " A Protein Sequenator," European Journal of Biochemistry, 1967, pp. 80– 91.

Primary Examiner—Morris O. Wolk
Assistant Examiner—R. E. Serwin
Attorney—Fidelman, Wolffe and Leitner

[57] ABSTRACT

An apparatus for synthesis of peptides or the like organic compounds, in which transfer of the selected reagents into and out of a reaction vessel is conducted by utilizing vacuum and a pressurized inert gas under control of various valves. No liquid pumps are required. The sequential operation of the valves may be automatically controlled by a programmer.

7 Claims, 3 Drawing Figures

PATENTED MAR 7 1972 3,647,390

3,647,390

APPARATUS FOR SYNTHESIS OF PEPTIDES OR THE LIKE ORGANIC COMPOUNDS

This invention relates to an apparatus for synthesis of complicated organic compounds such as peptides, proteins and the like. The invention is particularly applicable to what is commonly referred to in the art as "solid-phase peptide synthesis" and will be described with particular reference to this method of synthesis. However, it will be apparent as the invention is described, that it is also applicable to the synthesis of a number of proteins and the like compounds.

As is well known, according to the solid-phase method of synthesis, t-BOC-amino acids are successively applied to the matrix of a divinylbenzene resin to grow thereon as a long peptide chain. This method has indeed contributed very much to the science and art of peptide synthesis. However, the process requires a large number of steps and, consequently, time. For example, to add one amino acid to the growing peptide chain 11 reagents must be successively introduced into the reaction vessel in as many as 28 steps, and the operation requires several hours. The amount of a reagent required for one step of the process is proportional to the amount of the resin serving as an insoluble solid support in the reaction and the molar ratio of the amino acid first bonded to the resin. For synthesis of an ordinary peptide, if the reaction is to proceed 100 percent, the amount of an amino acid to be introduced into the reaction vessel is three to four times the amount of the amino acid required for the reaction. For example, the amount of the reagent used in one step of the process is no less than 20 to 40 ml. Since most of the reagents required for the reaction of synthesis are expensive, their loss in the transfer lines of the apparatus must be reduced to minimum. In this connection, mixing of different reagents remaining in the transfer lines must also be avoided. In order to shorten the total time required for all steps of the process to complete, selection of reagents and transfer thereof into and out of the reaction vessel must be conducted as quickly as possible, and in the reaction vessel it is required that the reagent selected and transferred into the vessel should stay in the space between the upper and lower glass filters during the course of reaction so as to be in good contact with the divinylbenzene resin provided in the space.

The primary object of the invention is therefore to provided a new and improved apparatus for synthesis of peptides, proteins or the like organic compounds, which completely meets the above-mentioned requirements.

The apparatus of the invention comprises a reaction vessel, a plurality of bottles containing reagents, a sampling vessel communicatable with the reaction vessel and a selected one of the bottles, a device for producing vacuum and a source of pressurized inert gas. The vacuum or reduced pressure is applied to the sampling vessel so as to withdraw a predetermined quantity of the selected reagent into the sampling vessel to be temporarily stored therein, and then the pressurized gas is introduced into the sampling vessel so as to push the reagent out of the sampling vessel into the reaction vessel. The selection and transfer of the reagents are performed by operating various valves included in the apparatus in a predetermined sequential manner, and the sequential operation of the valves can be automatically controlled by a suitable programmer. Since vacuum and the pressure of inert gas are utilized to transfer the reagents, the time required for the transfer is greatly reduced in comparison of the prior art devices which employ liquid pumps for the same purpose.

The invention will be more clearly understood by reading the following description of a preferred embodiment thereof with reference to the accompanying drawings, wherein.

Figure 1:
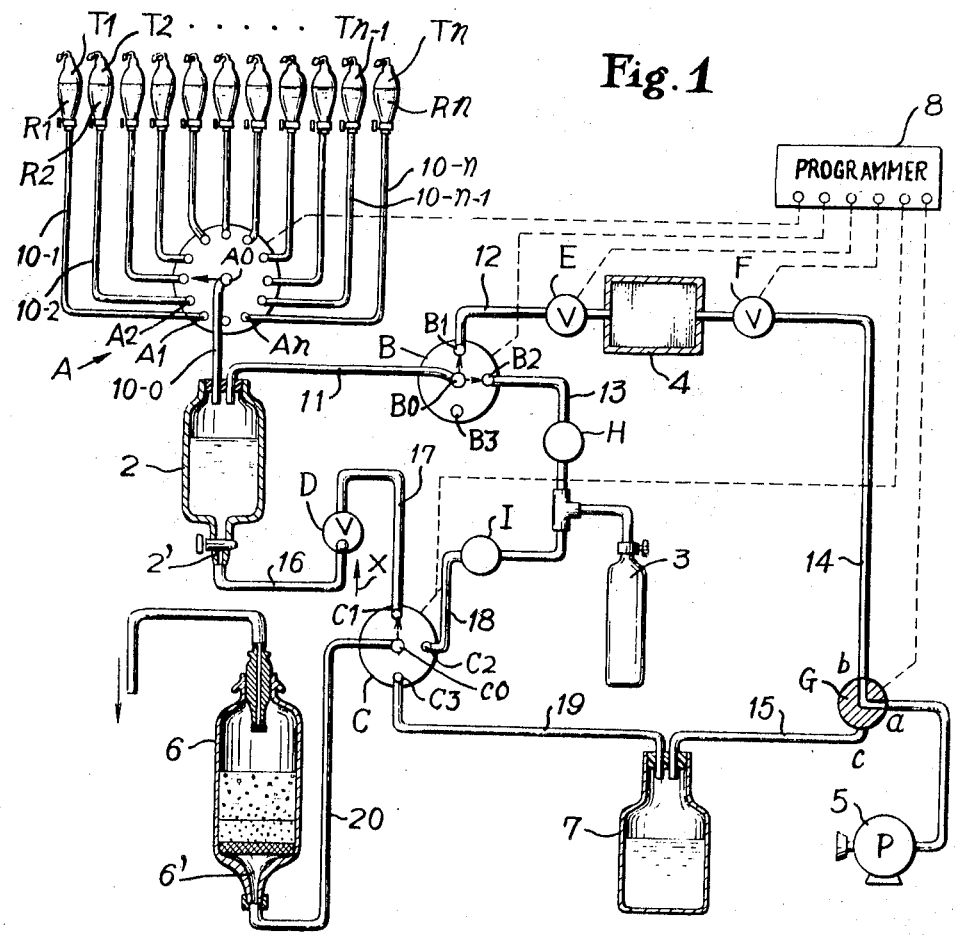
FIG. 1 is a schematic drawing of the apparatus embodying the invention.

Referring to FIG. 1, there are shown a plurality of bottles $T1, T2, \ldots, Tn$ each containing a reagent $R1, R2, \ldots, Rn$ required for synthesis of a desired peptide. A selector valve A is provided having a plurality of input ports $A1, A2, \ldots, An$ and a single output port Ao. The bottles T1–Tn are connected to the input ports A1–An through suitable pipes 10-1, 10-2, ..., 10-n, respectively, while a sampling vessel 2 is connected to the output port Ao through a suitable pipe 10-0. The vessel 2 is provided to temporarily store a predetermined quantity of a reagent selected by the selector valve A from the bottles in the manner to be described hereinafter. A valve B is provided to sequentially effect the transfer of the reagent from the selected bottle into the vessel 2 and thence into a reaction vessel to be described later. The valve B has four ports Bo, B1, B2 and B3. The port B1 is connected to the sampling vessel 2 through a pipe 11; the port B2, to a metering chamber 4 through a pipe 12 in which an electromagnetic vacuum valve E is inserted; the port B2, to a bomb 3 containing an inert gas such as argon or nitrogen through a pipe 13 in which a gas regulator H is inserted; and the port B3 is open to atmosphere. The chamber 4 determines the quantity of a reagent to be withdrawn from the selected one of the bottles T1–Tn into the sampling vessel 2. The inner volume of the chamber 4 may have a fixed value provided that it is large enough to enable the introduction into the vessel 2 of a reagent in such an amount as is required for the reaction in the vessel. The chamber 4 may also be variable in volume, or so designed that it can be automatically set to an optimum volume for each reagent. The chamber 4 is connected to a vacuum pump 5 through a suitable pipe 14 in which a vacuum valve F and an electromagnetic three-way valve G having ports $a$, $b$ and $c$ are inserted. The valve G selectively connects the pump 5 to the chamber 4 through the pipe 14 and to a waste vessel 7 through a pipe 15.

The sampling vessel 2 has an outlet opening 2', which is connected through a pipe 16 to a unidirectional valve D such as a ball valve so designed as to pass the flow of reagents through the pipe 16 in the direction of an arrow X but to block the flow therethrough in the opposite direction. A valve C is provided having three input ports C1, C2 and C3 and one output port Co. The port C1 is connected to the output side of the unidirectional valve D through a pipe 17; the port C2, to the bomb 3 through a pipe 18 in which a flow meter I is inserted; the port C3, to the waste vessel 7 through a pipe 19; and the output port Co, to a reaction vessel 6 through a pipe 20.

Figure 2:
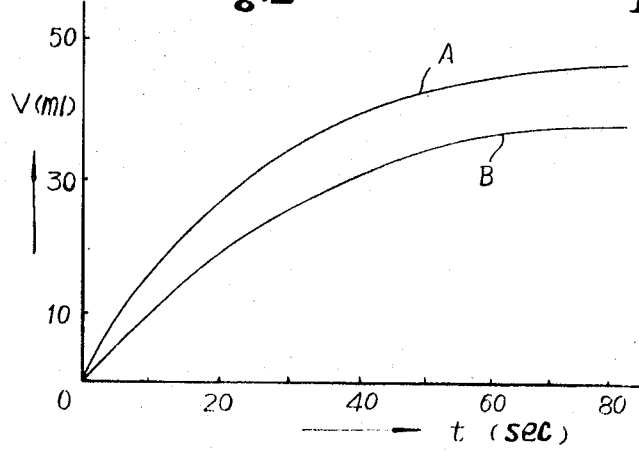
FIG. 2 is a graph illustrating the operation of the metering chamber used in the apparatus of FIG. 1.
Figure 3:
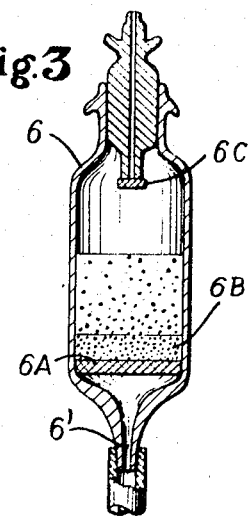
FIG. 3 is an enlarged sectional view of the reaction vessel used in the apparatus of the invention.

As shown in detail in FIG. 2, the reaction vessel 6 encloses therein a lower glass filter 6A disposed adjacent the bottom of the vessel, a layer of divinylbenzene resin 6B disposed closely on the lower filter and an upper filter 6C far above the layer 6B. The reagent is introduced into the vessel 6 through an inlet opening 6' formed in the bottom of the vessel and passes through the lower filter 6A to stay in the space between the lower and upper filters.

A programmer 8 controls and sequences the operations of the vacuum valves A to G.

The sequential operation of the apparatus will now be described with particular reference to the reagent R1 in the bottle T1.

First, in the valve A the input port A1 is connected to the output port Ao, so that the reagent R1 in the bottle T1 is ready to be withdrawn. Then, the valve E is closed and the valve F is opened, with the valve G being so set that the ports $a$ and $b$ are connected while the port $c$ is closed. This causes the vacuum pump 5 to evacuate air from the metering chamber 4. The valve B is then so operated that the ports Bo and B1 communicate as shown in FIG. 1, and the valve F is closed and the valve E, opened. (Simultaneously with the closing of the valve F, the port $a$ of the valve G may also be disconnected from the port $b$ and connected to the port $c$.) The opening of the valve E causes the pressure in the sampling vessel 2 to be reduced by a level corresponding to the volume of the chamber 4, so that the reagent R1 is withdrawn from the bottle T1 into the vessel 2. At this time, the valve D is closed due to the weight of the ball therein and the suction applied thereto from the chamber 4. The experiments conducted by the present inventors show that the quantity of the reagent that is introduced into the vessel 2 is substantially proportional to the volume of the vessel 2 provided that the pressure in the chamber 4 is below 0.1 mm. Hg, which level is reached by evacuation of the chamber 4 for 10 to 15 seconds. FIG. 2 is a graph in which the amount in ml. of a reagent withdrawn into the sampling vessel 2 is plotted against the time in seconds of evacuation of the metering chamber 4. The curve A was resulted in case the volume of the chamber 4 was 60 ml. and the curve B was resulted in case the volume was 48 ml.

When the required quantity of the reagent has been introduced into the vessel 2, the valve E is closed, and the port Bo of the valve B is disconnected from the port B1 and connected to the port B2, while the port Co of the valve C is connected to the port C1 as shown in FIG. 1. As a result, the inert gas in the bomb 3 is introduced through the regulator H and the valve B into the vessel 2 thereby to discharge the stored reagent out of the vessel 2. The reagent pushes the unidirectional valve D open to pass through the valve C into the reaction vessel 6 through the inlet opening 6' in the bottom thereof. The regulator H is set so that the pressure of the inert gas is enough to completely push the reagent upwardly through the lower filter 6A so as to stay in the space between the upper and lower filters 6A and 6C. Even when bubbling by the inert gas and shaking by a suitable mechanism, not shown, are conducted to accelerate the reaction in the vessel 6, the reagent can stay in the space between the upper and lower filters 6A and 6C. This assures thorough contact between the reagent and the resin and prevents loss of the reagent. The pressure of the inert gas also helps push the reagent remaining in the pipe 10-1 back into the bottle T1. Therefore, no reagent remains in the transfer lines between the bottle T1 and the reaction vessel 2. This is a great advantage of the apparatus of the invention, since if any reagent used in one step of the process remained in the pipe, it would mix and react with the reagent to be used in the next step thereby preventing the required reaction from proceeding properly.

When the introduction of the reagent R1 into the reaction vessel 6 has been completed, the port Bo of the valve B is connected to the port B3 which is open to atmosphere and the port Co of the valve C is connected to the port C2, whereupon the inert gas from the bomb 3 is introduced into the reaction vessel 6, wherein the gas causes bubbling to advance the reaction therein. After a predetermined period of time, the port Co of the valve C is connected to the port C3 and thence to the waste vessel 7 and the ports *a* and *c* of the three-way valve G are connected, so that the vacuum produced by the pump 5 is applied to the reaction vessel 6 through the valve G, the pipes 15, 19, the valve C and the pipe 20. This causes any excess reagent remaining in the vessel 6 to be withdrawn therefrom into the waste vessel 7. When the evacuation of the reaction vessel 6 has been completed, the valves G and C are restored to the original conditions as shown in FIG. 1, thereby completing this one step of the process.

With respect to the other reagents, the operation of the apparatus is the same as that described just above so that no particular description thereof will be required.

Thus, in accordance with the invention, all of the operations involved in the synthesis of peptides can be performed by operating the various valves in a predetermined sequential manner, and the sequential operation of the valves can be automatically controlled by a programmer. Since vacuum and the pressure of an inert gas are utilized to transfer the reagents, the time required for the operation of the apparatus is greatly reduced, and mixing of reagents used in different steps of the process can be completely avoided.

What we claim is:

1. In an apparatus for synthesis of organic compounds such as peptides, proteins, and the like, comprising a reaction vessel, a plurality of reagent bottles each containing a reagent required for said synthesis, a sampling vessel, a first means for selectively connecting said sampling vessel to one of said plurality of reagent bottles and to said reaction vessel, and reagent transfer means, the improvement in said reagent transfer means comprising a source of pressurized gas, a source of reduced pressure, and a second means for selectively connecting said source of pressurized gas and said source of reduced pressure to said sampling vessel, whereby transfer of reagent from one of said plurality of reagent bottles to said sampling vessel is effected by connecting said source of reduced pressure to said sampling vessel and transfer of reagent from said sampling vessel to said reaction vessel and excess reagent in said first means is returned to said one of said plurality of reagent bottles are effected by connecting said source of pressurized gas to said sampling vessel.

2. The apparatus of claim 1, wherein said reduced pressure-producing means comprises a chamber and a vacuum pump connected thereto for producing a reduced pressure in said chamber.

3. The apparatus of claim 2, wherein said chamber is fixed in volume.

4. The apparatus of claim 2, wherein said chamber is variable in volume.

5. The apparatus of claim 1, wherein said second connecting means connects said reaction vessel to said source of pressurized gas after said reagent is pushed into said reaction vessel, so that said gas is introduced in said reaction vessel to cause bubbling therein.

6. The apparatus of claim 1, wherein said second connecting means connects said reduced pressure producing means to said reaction vessel after the reaction therein for one step of the process of synthesis has been completed, and further including a waste vessel interposed between said reaction vessel and said reduced pressure-producing means so that any reagent remaining in said reaction vessel after completion of the reaction for one step of the process may be withdrawn by said reduced pressure into said waste vessel.

7. The apparatus of claim 1, further including a programmer for controlling the operations of said first, second and third connecting means in accordance with a predetermined program.

\* \* \* \* \*